(No Model.) 2 Sheets—Sheet 2.
J. P. JOHNSTON.
FERTILIZER DISTRIBUTER.

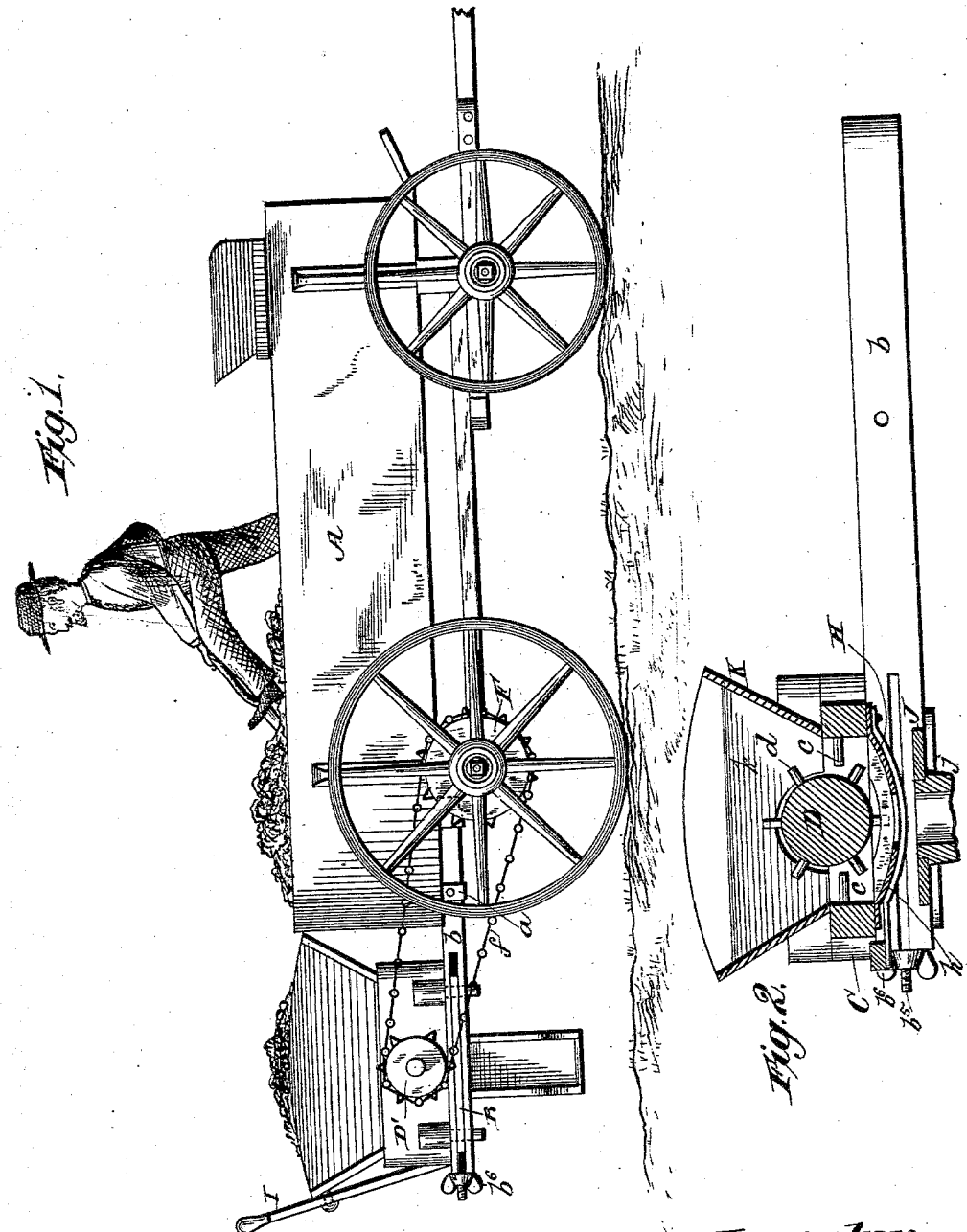

No. 280,932. Patented July 10, 1883.

Witnesses.
Robert Currutt
H Clay Smith

Inventor:
James P. Johnston
By Smith & Gooch
Attys

UNITED STATES PATENT OFFICE.

JAMES P. JOHNSTON, OF MELVILLE, GEORGIA.

FERTILIZER-DISTRIBUTER.

SPECIFICATION forming part of Letters Patent No. 280,932, dated July 10, 1883.

Application filed February 26, 1883. (No model.)

*To all whom it may concern:*

Be it known that I, JAMES P. JOHNSTON, a citizen of the United States of America, residing at Melville, in the county of Chattooga and State of Georgia, have invented certain new and useful Improvements in Fertilizer-Distributers, of which the following is a specification, reference being had therein to the accompanying drawings.

My invention relates to a means for grinding and distributing fertilizing material; and the novelty consists in the construction and arrangement of parts, as will be more fully hereinafter set forth, and specifically pointed out in the claim.

The object of the invention is to provide a device which will grind, disintegrate, and distribute the fertilizing material as the wagon containing said material passes across the field, and to have the grinding-power obtained from the same power which impels the wagon; and to this end the invention consists in the construction fully illustrated in the accompanying drawings, which form a part of this specification, and in which—

Figure 3:
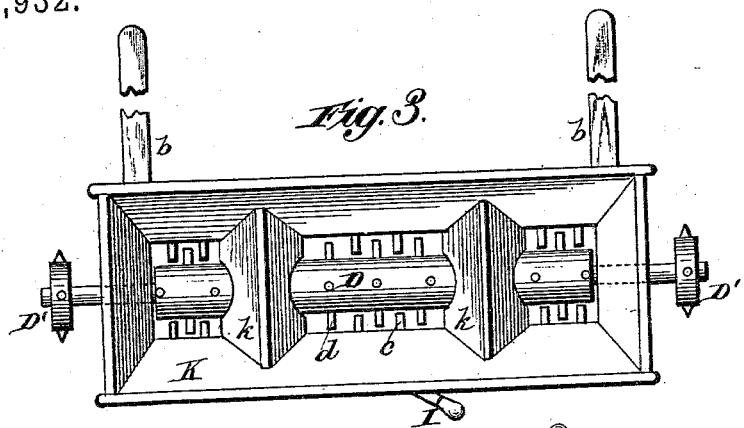
Figure 4:
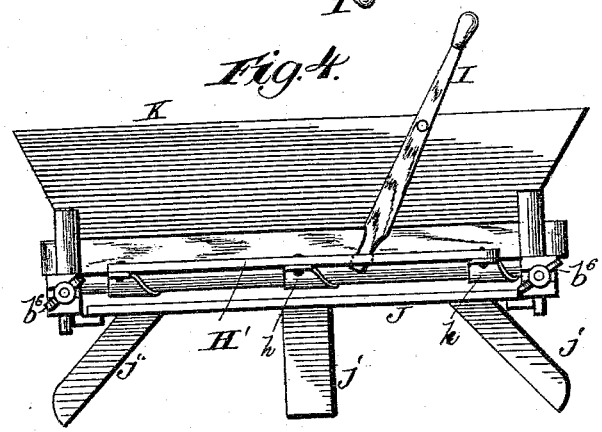
Figure 5:
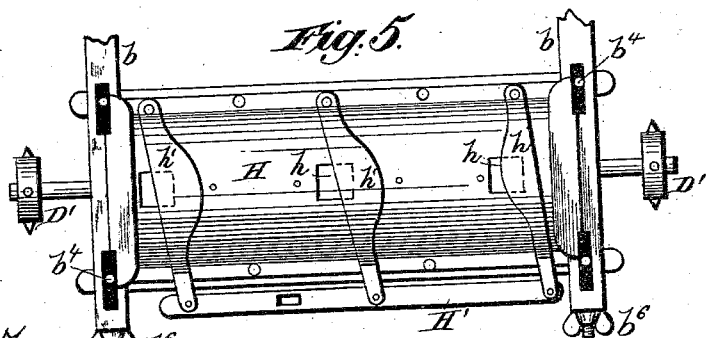
Figure 7:
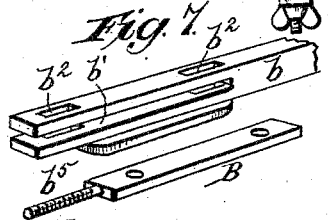
Figure 6:
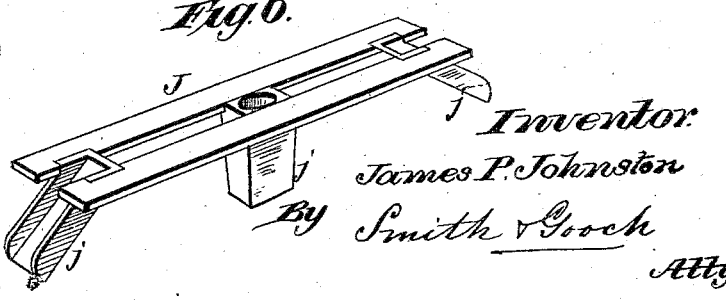

Figure 1 is a side elevation, showing the device attached to a wagon and in operation; Fig. 2, a cross-section; Fig. 3, a top plan view; Fig. 4, a side elevation of the back; Fig. 5, a bottom plan view, with the device shown in Fig. 6 removed. Fig. 6 is a perspective view of the spout-frame; and Fig. 7 is a perspective view, showing the means for adjusting the device in relation to the wagon.

Referring to the drawings, A represents the wagon, of any ordinary make, having guides $a$ to receive the arms $b$, which support the device. These arms $b$ carry a frame, C, having internally-projecting teeth or pins $c$, and which furnishes journal-bearings for a shaft or roller, D, having radially-projecting pins $d$. One or both of the rear wheels of the wagon A is provided with a sprocket-wheel, F, over which passes a chain, $f$, said chain passing over a proper pulley or sprocket, D', and this arrangement gives motion to the roller D.

To insure the proper tension to the chain, and to adjust the device properly in relation to the wagon, I form a long horizontal slot, $b'$, in the arms $b$, and two slots, $b^2$, vertically therein.

The frame C is supported upon a plate, B, which works in the horizontal slot $b'$, while pins $b^4$, rigid with the plate B, operate in the slots $b^2$. The plate B has a threaded portion, $b^5$, upon which a thumb-nut, $b^6$, operates to throw the plate backward or forward.

A concavo-convex bottom, H, is provided with three or more apertures, $h$, governed by valves $h'$, one end of each of which is secured to the frame C and the other ends to a bar, H', which may be manipulated by a lever, I, to adjust the size of the apertures $h$ at will.

A frame, J, is provided with spouts $j$, corresponding with the apertures $h$, and the two outer ones serve to throw the fertilizing material outward from the center.

Upon the frame C rests a hopper, K, having inclined partitions $k$, which tend to throw the material toward the different groups of pins $d$ upon the roll D.

The device, it will be observed, is secured to the rear of a wagon, and the material may readily be thrown from the wagon into the hopper.

The operation is obvious.

What I claim as new is—

The plates B, having threaded portion $b^5$, the frame C, and nut $b^6$, combined with the arms $b$, having slot $b'$ and slots $b^2$, as and for the purposes set forth.

In testimony whereof I affix my signature, in presence of two witnesses, this 21st day of February, 1883.

JAMES P. JOHNSTON.

Witnesses:
 C. V. AKRIDGE,
 JOHN F. RICE.